United States Patent
Müller et al.

(10) Patent No.: US 6,549,779 B1
(45) Date of Patent: Apr. 15, 2003

(54) METHOD AND SYSTEM FOR IMPROVING THE PERFORMANCE OF INTER-SYSTEMS HANDOVERS

(75) Inventors: Walter Müller, Upplands Väsby (SE); Pontus Wallentin, Ljungsbro (SE); Himke van der Velde, Zwolle (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/483,743

(22) Filed: Jan. 17, 2000

(51) Int. Cl.[7] .................................................. H04Q 7/38
(52) U.S. Cl. ...................... 455/439; 455/426; 455/438; 370/331
(58) Field of Search .......................... 455/436, 438, 455/439, 443, 444, 426; 370/331

(56) References Cited

U.S. PATENT DOCUMENTS 5,812,543 A * 9/1998 Sugita ........................ 370/335
6,311,054 B1 * 10/2001 Korpela ...................... 455/406

FOREIGN PATENT DOCUMENTS

EP        0 888 026 A2   12/1998
WO        WO 98/06226    2/1998

OTHER PUBLICATIONS

EPO Search RS 104487 US; completed Jun. 20, 2000.

* cited by examiner

Primary Examiner—Lee Nguyen
(74) Attorney, Agent, or Firm—Jenkens & Gilchrist, P.C.

(57) ABSTRACT

A preferred embodiment of an invention is disclosed, whereby the size of certain (e.g., S-RNTI and scrambling code number) Information Elements (IEs) in the UTRAN RRC "HANDOVER TO UTRAN COMMAND" message can be reduced, by reserving a subrange of the IE parameter values for exclusive use by the User Equipment (UE) which is performing an inter-Radio Access Technology (RAT) handover to a UTRAN. For example, the lowest values of scrambling code number or S-RNTI number can be reserved for initial assignment to a UE performing a handover from one system network to the UTRAN. Upon completion of the handover procedure, the UTRAN can assign another scrambling code number or S-RNTI number to that UE. Consequently, by significantly reducing the size of the IEs used in the HANDOVER TO UTRAN COMMAND message, additional (e.g., optional) parameters may also be used in the same message.

14 Claims, 1 Drawing Sheet

METHOD AND SYSTEM FOR IMPROVING THE PERFORMANCE OF INTER-SYSTEMS HANDOVERS

BACKGROUND OF THE INVENTION

1. Technical Field of the Invention

The present invention relates in general to the mobile communications field and, in particular, to a method and system for improving the performance of handovers between different mobile communication systems.

2. Description of Related Art

While performing a handover of a mobile terminal from a Global System for Mobile Communications (GSM) network to a Universal Mobile Telecommunications System Terrestrial Radio Access Network (UTRAN), the UTRAN Radio Resource Control (RRC) "HANDOVER TO UTRAN COMMAND" message is to be transferred to the mobile terminal via the GSM network. In order to achieve adequate performance, it is essential that the UTRAN RRC message be transferred to the mobile terminal within a non-segmented GSM radio air interface message. However, in the GSM, the air interface signalling uses a window size of 1. As such, a GSM Base Station Controller (BSC) will not transfer a second message segment prior to receiving an acknowledgment message for a first message segment. Consequently, if the uplink connection is of relatively poor quality when a handover is initiated, the BSC may never receive an acknowledgment message for the first message segment and thus will be unable to convey the second message segment to the mobile terminal. Nevertheless, in the case where the UTRAN RRC message fits into a non-segmented GSM air interface message, the handover can be performed regardless of the quality of the GSM uplink connection.

In order to avoid performance problems, the size of the UTRAN RRC HANDOVER TO UTRAN COMMAND message should be less than 18 octets or 144 bits. This result can be achieved by using predefined parameter settings and transferring information after the handover procedure has been completed. However, this approach of using predefined parameter settings reduces flexibility, and the handover performance can degrade if the activation of certain non-essential functions (e.g., multiple radio links, SSDT, etc.) is deferred until the handover procedure has been completed.

Certain network operators consider the immediate activation of the functions more important than avoiding the problems related to the use of multiple GSM message segments. In order to support these particular operators, it is possible to make allowances for optional parameters. However, the use of optional parameters results in an increase of the message length even when such a parameter is not included in the message. In other words, the use of optional parameters affects the minimum message size. Currently, given the present state of the art, it is not possible to allow the use of all desired optional parameters, because that use would imply that a message would no longer fit within a single segment. Accordingly, there is a need for a solution whereby a handover message will have room to include additional (e.g., optional) parameters. As described in detail below, the present invention successfully resolves the above-described problems and other related problems.

SUMMARY OF THE INVENTION

In accordance with a preferred embodiment of the present invention, the sizes of certain (e.g., S-RNTI and scrambling code number) Information Elements (IEs) in the. UTRAN RRC HANDOVER TO UTRAN COMMAND message can be reduced, by reserving a subrange of the IE parameter values for exclusive use by the User Equipment (UE) which is performing an inter-Radio Access Technology (RAT) handover to a UTRAN. For example, the lowest values of scrambling code number or Serving-Radio Network Temporary Identity (S-RNTI) number, which is part of a Universal-RNTI (U-RNTI) number, can be reserved for initial assignment to a UE performing a handover to the UTRAN. Upon completion of the handover procedure, the UTRAN can assign another scrambling code number or S-RNTI-number to that UEE. Consequently, by significantly reducing the size of the IEs used in the HANDOVER TO UTRAN COMMAND message, additional (e.g., optional) parameters may also be used. As such, the space that becomes available in the HANDOVER TO UTRAN COMMAND message may also be used to create options for avoiding the use of predefined radio configurations, which results in increased flexibility.

An important technical advantage of the present invention is that the quality of handover procedures to UTRANs from other system networks is significantly improved.

Another important technical advantage of the present invention is that an improved handover command message can be transmitted from a system network to a UE within a non-segmented air interface message.

Still another important technical advantage of the present invention is that optional parameters can be included in a handover command message from a system to a UE, which increases the performance of handovers to a UTRAN from other system networks.

Still another important technical advantage of the present invention is that the size of the information elements in a handover command message can be reduced so that a single, non-segmented message can be transferred in its entirety across a (GSM) radio air interface.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
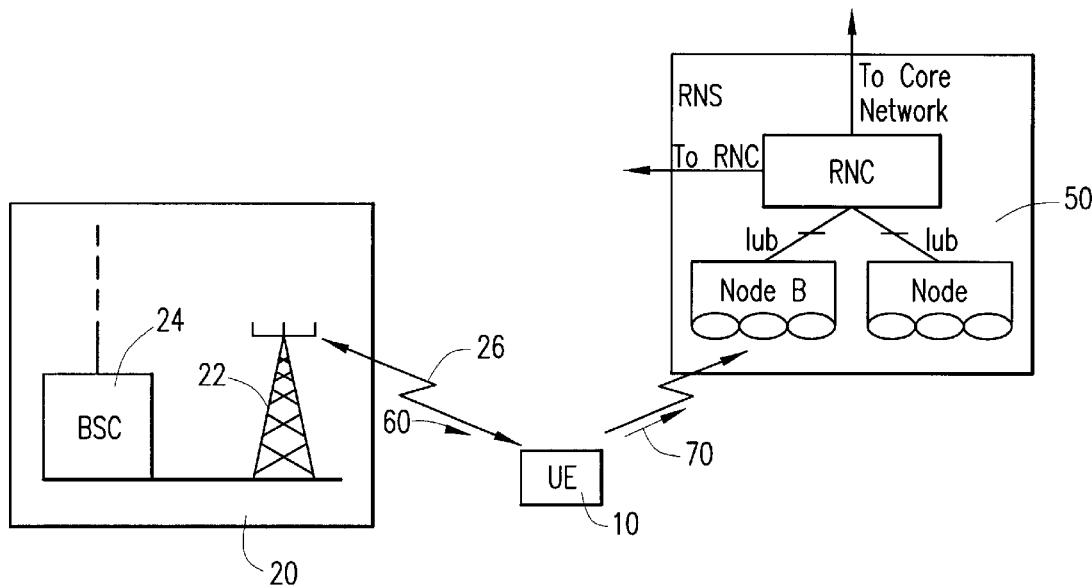
FIG. 1 is a block diagram that can be used to illustrate a preferred embodiment of the present invention.
Figure 2:
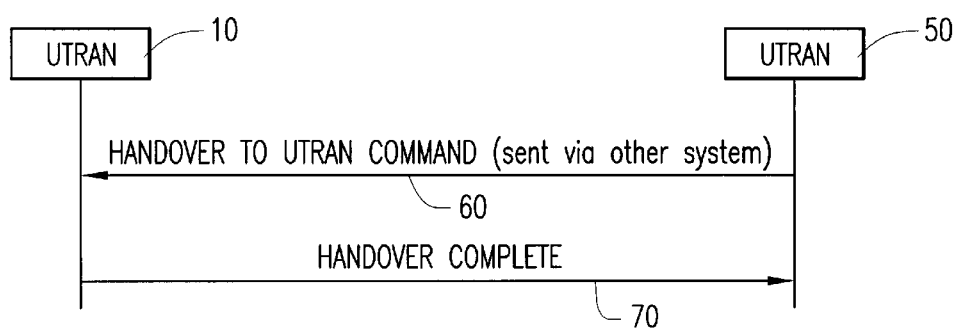
FIG. 2 is a time sequence diagram that can be used to illustrate the preferred embodiment of the present invention.

The preferred embodiment of the present invention and its advantages are best understood by referring to FIGS. 1–2 of the drawings, like numerals being used for like and corresponding parts of the various drawings.

Essentially, in accordance with a preferred embodiment of the present invention, the sizes of certain (e.g., S-RNTI and scrambling code number) IEs in the UTRAN RRC HANDOVER TO UTRAN COMMAND message can be reduced, by reserving a subrange of the IE parameter values for exclusive use by the UE which is performing an inter-RAT handover to a UTRAN. For example, the lowest values of scrambling code number (or S-RNTI number) can be reserved for initial assignment to a UE performing a handover to the UTRAN. Upon completion of the handover procedure, the UTRAN can assign another scrambling code number (or S-RNTI number) to that UE. Consequently, by significantly reducing the size of the IEs used in the RRC HANDOVER TO UTRAN COMMAND message, additional (e.g., optional) parameters may also be obtained by the same handover command message. As such, the space that becomes available in the HANDOVER TO UTRAN COMMAND message may also be used, to create options for avoiding the use of predefined radio configurations, which results in increased flexibility.

Specifically, FIG. 1 is a block diagram that can be used to illustrate a preferred embodiment of the present invention. For this exemplary embodiment, a UE (e.g., mobile terminal) 10 is to perform an inter-system handover from a first system (e.g., GSM) network 20 to a UTRAN 50. The procedure is initiated when the first system 20 orders the UE 10 to perform a handover to the UTRAN 50. For a handover from an external system to a UTRAN, the handover procedure is preferably to be performed in accordance with UTRAN RRC Protocol Specification TS 25.331.

FIG. 2 is a time sequence diagram that can be used to illustrate the preferred embodiment of the present invention. Referring to FIGS. 1 and 2, in order to initiate an inter-system handover from the first radio access. system (e.g., GSM) network 20 to the UTRAN 50 the first system network 20 transmits a "HANDOVER TO UTRAN COMMAND" message 60 over. the radio air interface 26 (on an existing connection) to the UE 10. The following information is included in (but not necessarily limited to) the message 60: the IE "U-RNTI" to be assigned; the IE "Predefined radio configuration identity," which indicates a predefined configuration of radio base station, traffic channel and physical channel parameters to be used; and the Physical Channel (PhyCH) IEs (including scrambling code number).

In accordance with the preferred embodiment of the present invention, during a handover procedure from the first system to the UTRAN, the UTRAN 50 initially assigns values for the "S-RNTI" and "scrambling code number" IEs that are within certain subranges defined exclusively for this type of handover procedure. As an illustrative example, for a handover of a UE (10) from a GSM network (20) to a.UTRAN (50) using the above-described subranges; the size of the "U-RNTI" IE can be reduced by reducing the "S-RNTI" IE part of the "U-RNTI" IE from 32 bits to 10 bits/1024 values, and the size of the "scrambling code number" IE can be reduced from 24 bits to 13 bits/up to 8192 values. It is important to note at this point that the above-described numbers and/or values are for illustrative purposes only and not intended as a limitation on the invention. (Typically, the current "S-RNTI" IE part of the "U-RNTI" IE has a value between 0 and 4095, and the "scrambling code number" has a value between 0 and 65535.) Preferably, for this exemplary embodiment, the lower values for the "S-RNTI" and "scrambling code number" are used initially for the handover procedure. In this way, the size of the IEs in the handover command message 60 can be reduced significantly to the extent that there is now room for additional (e.g., optional) IEs to be included in the message.

For example, in accordance with this exemplary embodiment, the following additional information can now be included (but not necessarily limited to) in the handover command message 60: Downlink DPCH compressed mode information; SSDT indicator information; etc. In this way, the quality of the handover from the first system, (e.g., GSM) network to the UTRAN can be significantly improved.

Once the UE 10 receives a "HANDOVER TO UTRAN COMMAND" message 60, the UE stores (locally) the value of the "U-RNTI" IE. The UE then initiates the signalling link with the UTRAN 50, the radio base station,(s) and traffic channel(s), in accordance with the predefine,d parameters identified by the "Predefined radio configuration identity" IE and Psych. IE. The UE also performs other functions related to the handover procedure, in accordance with the above-described RRC Protocol Specification.

If the UE 10 successfully establishes a connection to the UTRAN 50, the UE transmits a "HANDOVER COMPLETE" message 70 on the uplink Dedicated Control Channel (DCCH). The UTRAN Radio Link Control (RLC) (not shown) confirms the reception of the "HANDOVER COMPLETE" message 70, and the handover procedure is terminated. Upon completion of the handover procedure, the UTRAN can assign anbther scrambling code number or S-RNTI number to that UE.

On the other hand, if the UE 10 does not succeed in establishing a connection to the UTRAN 50, then the UE terminates the handover procedure and releases the associated resources. The UE 10 then resumes the connection used before the handover procedure was initiated, and indicates the failure to the other radio access system (e.g., GSM) network 20.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of thee invention as set forth and defined by the following claims.

What is claimed is:

1. A method for improving the performance of a handover procedure from a first system network to a UTRAN, comprising:

generating a handover command message for initiating a handover from said first system network to said UTRAN;

reducing a size of at least one information element in said handover command message;

adding at least one optional parameter to said handover command message; and transferring said handover command message to a user equipment for said performance of said handover procedure.

2. The method of claim 1, wherein said first system network comprises a GSM network.

3. The method of claim 1, wherein said at least one information element comprises an S-RNTI information element.

4. The method of claim 1, wherein said at least one information element comprises a scrambling code number information element.

5. The method of claim 1, wherein said handover command message comprises a HANDOVER TO UTRAN COMMAND message.

6. The method of claim 1, wherein said transferring comprises transmitting said handover command message over a GSM radio air interface.

7. A system for improving the performance of a handover procedure, comprising:

a first system network;

a UTRAN; and a user equipment, said system further comprising:

means for generating a handover command message for initiating a handover from said first system network to said UTRAN;

means for reducing a size of at least one information element in said handover command message;

means for adding at least one optional parameter to said handover command message; and means for transferring said handover command message to said user equipment for said performance of said handover procedure.

8. The system of claim 7, wherein said first system network comprises a GSM network.

9. The system of claim 7, wherein said at least one information element comprises an S-RNTI information element.

10. The system of claim 7, wherein said at least one information element comprises a scrambling code number information element.

11. The system of claim 7, wherein said handover command message comprises a HANDOVER TO UTRAN COMMAND message.

12. The system of claim 7, wherein said means for transferring comprises means for transmitting said handover command message over a GSM radio air interface.

13. A method for transmitting a handover to UTRAN command from a GSM network to a user equipment, said method comprising:

reducing a size of said handover to UTRAN command into a reduced size handover to UTRAN command such that a S-RNTI or scrambling code number within said reduced size handover to UTRAN command is reduced by a predetermined number of bits; and incorporating at least one optional parameter into said reduced size handover to UTRAN command; and transmitting said reduced size handover to UTRAN command from said GSM to said user equipment within a non-segmented air interface message.

14. The method of claim 13, wherein said at least one optional parameter to one of a downlink DPCH compressed mode information and a SSDT indicator information.

* * * * *

UNITED STATES PATENT AND TRADEMARK OFFICE
CERTIFICATE OF CORRECTION

PATENT NO. : 6,549,779 B1  Page 1 of 1
DATED : April 15, 2003
INVENTOR(S) : Walter Müller et al.

It is certified that error appears in the above-identified patent and that said Letters Patent is hereby corrected as shown below:

Title page, Item [54] and Column 1, lines 1-3,
Replace "METHOD AND SYSTEM FOR IMPROVING THE PERFORMANCE OF INTER-SYSTEMS HANDOVERS" with -- METHOD AND SYSTEM FOR IMPROVING THE PERFORMANCE OF INTER-SYSTEM HANDOVERS --.

Drawings,
Figure 2, "UTRAN 10" with -- UE 10 --

Column 2,
Line 13, replace "to the UEE." with -- to that UE. --

Column 3,
Line 6, replace "also be used, to" with -- also be used to --
Line 22, replace "access. system" with -- access system --.
Line 23, replace "UTRAN 50 the" with -- UTRAN 50, the --
Line 25, replace "60 over. the" with -- 60 over the --
Line 40, replace "a.UTRAN" with -- a UTRAN --
Line 40, replace "subranges;" with -- subranges, --
Line 62, replace "the first system," with -- the first system --

Column 4,
Line 2, replace "base station, (s)" with -- base station (s) --
Line 3, replace "predefine,d" with -- predefined --
Line 14, replace "anbther" with -- another --
Line 29, replace "thee invention" with -- the invention --

Signed and Sealed this

Twenty-second Day of July, 2003

JAMES E. ROGAN
*Director of the United States Patent and Trademark Office*